MILTON U. CLAUSER
INVENTOR.
BY Robert H. Fraser
ATTORNEY

MILTON U. CLAUSER
INVENTOR.

BY Robert H. Fraser
ATTORNEY

Feb. 23, 1965 M. U. CLAUSER 3,171,035

SUPERCONDUCTIVE CIRCUITS

Filed May 26, 1958 3 Sheets-Sheet 3

MILTON U. CLAUSER
INVENTOR.

BY Robert H. Fraser

ATTORNEY

United States Patent Office 3,171,035
Patented Feb. 23, 1965

3,171,035
SUPERCONDUCTIVE CIRCUITS
Milton U. Clauser, Rolling Hills, Calif., assignor, by mesne assignments, to The Bunker-Ramo Corporation, Stamford, Conn., a corporation of Delaware
Filed May 26, 1958, Ser. No. 737,722
22 Claims. (Cl. 307—88.5)

This invention relates to electrical circuits including superconductive elements, and more particularly to an electrical circuit in which at least one superconductor in the form of a thin film of material is switched from a superconductive to a resistive state under the influence of current flow in an adjacent conductor.

In the investigation of the electrical properties of materials at very low temperatures it has been found that as the ambient temperature is lowered, the electrical resistance of many materials drops abruptly to an immeasurably small value at a particular temperature near absolute zero (0° Kelvin) for each material so that the material may be termed superconductive. Recently, equipment for obtaining and maintaining such temperatures has been vastly improved so that utilization of superconductive materials in practical electrical circuits is now feasible.

An area of endeavor in which there is a need for improved electrical circuits and components of reduced size and increased speed of response is that of data processing and digital computer systems. In such systems, digital information is frequently represented by electrical signals which are passed through a myriad of electrical circuits to perform computations and manipulations of a complexity and magnitude which would be impractical by any manual means.

In digital computers and data processing equipment in which information is handled by means of electrical signals representing digital values, it is well known to employ a circuit which controls the path of an electrical current or generates a signal in accordance with the occurrence or concurrence of conditions established within the circuit. By means of a combination of such circuits, computations and manipulations may be performed in accordance with a logical system. Accordingly, the circuits are known as "logical circuits."

In a co-pending United States patent application entitled "Superconductive Electrical Circuits," filed June 5, 1957, Serial No. 663,668, in the name of Eugene C. Crittenden, Jr., there is described an electrical circuit, constructed of superconductive materials, which is capable of sustaining a persistent circulating current flow around a loop indefinitely so long as the circuit remains superconducting. By virtue of the capability of the circuit loop in sustaining a current, a device may be constructed for storing information as a function of the direction of persistent current flow, with the direction of current flow being ascertainable by applying a sensing pulse to the loop which renders a portion of the loop electrically resistive when the sensing pulse is additive with respect to the persistent flow through that portion.

While the electrical circuits of the aforesaid application Serial No. 663,668 may be used with conventional logical circuits, a complete data processing system will require logical circuits utilizing superconductive elements for use along with superconductive information storage circuits. Accordingly, it is one object of the present invention to provide a new and improved logical circuit in which a superconductor in the form of a thin film of superconductive material may be switched from a superconductive state to a resistive state under the influence of current flow through a control element.

It is another object of the present invention to provide a superconductive logical circuit in which the interaction between thin films of materials is utilized to provide an output signal in accordance with the occurrence or concurrence of a plurality of input signals.

It is a further object of the invention to provide a logical circuit in which a superconductive element is switched to a resistive state under the influence of heat generated by current flow in a control element.

It is yet another object of the present invention to provide a superconductive circuit element for storing information as a function of a resistive state established in a film of superconductive material under the influence of heat generated by current flow in a control element.

Briefly, in accordance with the invention, a plurality of thin films of material are arranged so that at least one thin film of superconductive material is capable of being switched from a superconductive to an electrically resistive state. By applying input currents to one or more of the superconductive films, a selected superconductive film becomes electrically resistive to represent the occurrence or concurrence of the input signals.

In one mode of operation of an embodiment of the invention, the adjacent films are adapted to switch a superconductive film from a superconductive to an electrically resistive state in response to magnetic fields generated by currents flowing through the adjacent films.

In another mode of operation of an embodiment of the invention, a superconductive film is switched from a superconductive to an electrically resistive state in response to heat generated by current flow through at least one of the adjacent films.

In an alternative embodiment of the invention, a thin superconductive film is switched to a resistive state by means of at least one control element which generates heat in accordance with an input signal. The thin superconductive film and the control element are oriented in such a way that the superconductive film remains electrically resistive for a period succeeding the input signal applied to the control element whereby a subsequent signal applied to the superconductive film is capable of sensing the application of a preceding input signal to the control element. Thus, information may be stored for an interval of time in accordance with the resistive state of the superconductive film.

A better understanding of the invention may be had from a reading of the following detailed description and an inspection of the drawings, in which.

At temperatures near absolute zero, some materials lose all measurable resistance to the flow of electrical current and become what appear to be perfect conductors. The phenomenon is called superconductivity and the temperature at which the change occurs from a normally resistive state to a superconductive state is called the transition temperature. For example, the following materials have a transition temperature and become superconductive at the temperatures listed:

| | Degrees Kelvin |
|---|---|
| Niobium | 8 |
| Lead | 7.2 |
| Vanadium | 5.1 |
| Tantalum | 4.4 |
| Mercury | 4.1 |
| Tin | 3.7 |
| Indium | 3.3 |
| Tellurium | 2.4 |
| Aluminum | 1.2 |

Only a few of the materials exhibiting superconductivity are listed above. Other elements and many alloys and compounds become superconductive at temperatures ranging between 0° and 17° Kelvin. A discussion of many such materials may be found, for example, in a book entitled "Superconductivity" by D. Schoenberg, Cambridge University Press, Cambridge, England, 1952.

The above listed transition temperatures apply only where the materials are in a substantially zero magnetic field. In the presence of a magnetic field, such as an externally applied magnetic field, the transition temperature is decreased so that a given material may be in an electrically resistive state even at temperatures below the normal transition temperature at which the material would be superconductive in the absence of a magnetic field.

In addition, the above listed transition temperatures apply only for values of substantially zero electrical current flow through the material since the internal current flow produces an associated magnetic field. Thus, when a current flows through a material, the transition temperature is decreased so that the material may be in an electrically resistive state even though the temperature of the material is lower than the normal transition temperature at which the material would otherwise be superconductive. The action of the magnetic field associated with current flow through the material, in lowering the transition temperature, is similar to the lowering of the transition temperature by an externally applied magnetic field.

Accordingly, the superconductive condition of a material may be extinguished by elevating the temperature, by application of a magnetic field which may originate in an external source, or by passing a current through the material.

Figure 1:
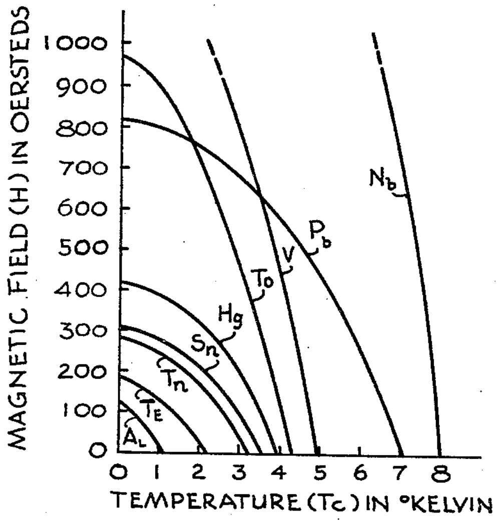
FIG. 1 is a graph illustrating the variation in transition temperatures for various materials subjected to a magnetic field.

FIG. 1 illustrates the variation in transition temperatures ($T_c$) for several materials as a function of an applied magnetic field. In the absence of a magnetic field the point at which each of the several curves intersects the abscissa is the transition temperature at which the material becomes superconductive, given in degrees Kelvin. For values of temperature and magnetic field falling beneath each of the several curves the particular material is superconductive, while for values of temperature and magnetic field falling above the curve the material is electrically resistive.

Figure 2:
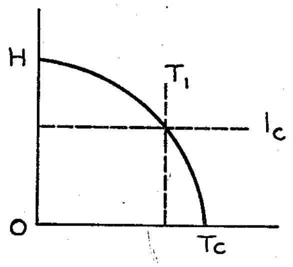
FIG. 2 is a graph of the transition temperature of a particular material as a function of a magnetic field.

The effect of varying the magnetic field applied to a particular material while maintaining the material at a constant temperature lower than the transition temperature is illustrated in FIG. 2. The dashed line $T_1$ represents a constant temperature line. For a magnetic field greater than the value (line $I_c$) of the point of intersection between the line $T_1$ and the transition temperature curve peculiar to the particular material used, the material is electrically resistive. However, for a magnetic field having a value less than the value ($I_c$) of the point of intersection between the line $T_1$ and the curve, the material is superconductive.

Figure 3:
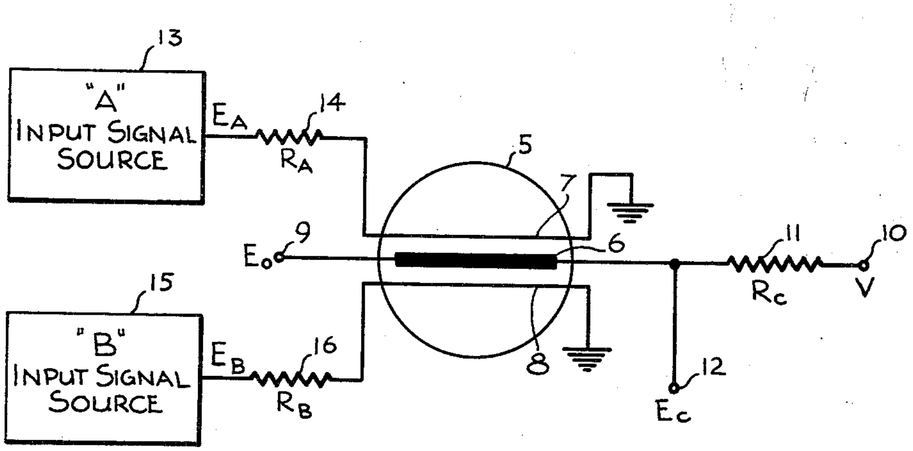
FIG. 3 is a combined block and schematic diagram of a logical circuit including superconductive elements in accordance with the invention.

FIG. 3 is a combined block and schematic circuit diagram of a simple logical circuit which is adapted to function in accordance with the foregoing principles. The circuit of FIG. 3 includes a switching device, represented diagrammatically by a circle 5, which includes a superconductor 6 (the element to be controlled) in the form of a thin film of a material which is capable of being switched from a superconductive condition to a resistive condition under the influence of an applied magnetic field, a change in operating temperature, or both. Adjacent to the superconductor 6, and intimately associated therewith, are positioned control elements 7 and 8. The control elements 7 and 8 are coupled to the superconductor 6 to switch the superconductor 6 from a superconductive state to an electrically resistive state in response to current flow in the control elements 7 and 8, the control elements effecting the change in state of the superconductor either by the application of magnetic fields or heat.

Since the apparatus of FIG. 3 depends for its operation on the switching of the superconductor 6 from a superconductive condition to an electrically resistive condition, the device 5 is preferably sustained at a suitable low temperature below the transition temperature for the material of which it is constructed. Therefore, in the absence of any current flow through the control elements 7 and 8, the superconductor 6 is in a superconductive condition so that the superconductor 6 presents no resistance to the flow of current. Suitable apparatus for sustaining such a temperature is described in detail below.

The circuit of FIG. 3 is adapted to perform a switching or logical function by virtue of the ability of the control elements 7 and 8 to switch the superconductor 6 from a superconductive condition to an electrically resistive condition. This may be accomplished by passing a current through the control element 7 from an "A" input signal source 13 via a resistor 14 and by passing a current through the control element 8 from a "B" input signal source 15 via a resistor 16.

In one mode of operation the apparatus may be arranged so that the magnetic fields generated by currents flowing through the control elements 7 and 8 function to switch the superconductor 6 from a superconductive to an electrically resistive state. However, in another mode of operation, the control elements 7 and 8 may be arranged to have their association with the superconductor and their electrical resistances such that heat is generated in accordance with the flow of current through the control elements, which heat elevates the operating temperature of the superconductor 6 to switch it to an electrically resistive state. Where the apparatus is arranged to switch the superconductor 6 under the influence of magnetic fields, the control elements 7 and 8 may be constructed of materials which remain superconductive during the entire operation with the resistors 14 and 16 being included for the purpose of limiting the maximum current flow therethrough. On the other hand, where the code of operation is such that the superconductor 6 is to be switched to an electrically resistive condition by elevating its operating temperature, the control elements 7 and 8 may be constructed of ordinary materials which present electrical resistance to the flow of current at the ambient temperatures of the apparatus so that the resistors 14 and 16 may be omitted, with the current limiting resistance being supplied by the control elements 7 and 8 internally.

As is well known, the primary logical operations to be performed in many data processing or digital computer systems are the binary addition and multiplication of Boolean algebra. A discussion of the application of Boolean algebra to digital computer systems may be found, for example, in an article entitled "An Algebraic Theory for Use in Digital Computer Design," by E. C. Nelson, Transactions of the Institute of Radio Engineers, vol. EC–3, No. 3, September 1954.

In binary addition and multiplication by means of Boolean algebra, two binary inputs may be multiplied or may be in accordance with the following table:

*Table I*

| A | B | A+B | A×B | $\bar{A}$ |
|---|---|---|---|---|
| 0 | 0 | 0 | 0 | 1 |
| 0 | 1 | 1 | 0 | 1 |
| 1 | 0 | 1 | 0 | 0 |
| 1 | 1 | 1 | 1 | 0 |

The third operation above symbolized by $\bar{A}$ is defined as the complement or negation of A. In order to perform complex logical functions only a limited number of individual operations are required, as for example, those given in the above table. Other necessary logical functions can then be derived as combinations of the given operations.

If 0 and 1 correspond to electrical signals equal to $E_0$ and $E_1$ from the "A" input signal source 13 and "B" input signal source 15 of FIG. 3, the circuit may be arranged to provide an output voltage in accordance with the addition and multiplication of the Boolean algebra set forth in Table I. For example, let the resistance 14 be termed $R_A$ and the resistance 16 be termed $R_B$ with the value such that when the voltage from the "A" input signal source $E_A$ and the voltage from the "B" input source $E_B$ each equals $E_0$, corresponding to $A=0$ and $B=0$, there is insufficient current to produce a temperature rise or a magnetic field of a magnitude sufficient to effect a transition to an electrically resistive state in the superconductor 6. Therefore, the resistance of the superconductor 6 is equal to 0 and the voltage $E_c$ appearing at the terminal 12 equals a voltage $E_0$ representative of 0, which voltage may be applied to the terminal 9. The 0 voltage at the terminal 12 corresponds to $C=0$ which is in accordance with the logical operations of $A+B$ or $A\times B$ given in Table I. In addition, let the resistances 14 and 16 have values such that when either the voltage from the "A" input signal source 13 or the "B" input signal source 15 is increased to $E_1$, sufficient current flows through the control elements 7 and 8 to effect a transition of the superconductor 6 to an electrically resistive state; in this state the value of the resistance presented by the superconductor 6 in its resistive state may be termed $R_s$. If the value of the voltage applied to the terminal 10 is equal to V, and the resistor 11 has a resistance $R_c$, and $$\frac{R_s}{R_s+R_c}(V-E_0)=E_1-E_0$$

then the voltage $E_c$ at the terminal 12 equals $E_1$, which corresponds to $C=1$, and the circuit is capable of performing the following operations:

*Table II* ($A+B=C$)

| $E_A$ | A | $E_B$ | B | $E_c$ | C |
|---|---|---|---|---|---|
| $E_0$ | 0 | $E_0$ | 0 | $E_0$ | 0 |
| $E_0$ | 0 | $E_1$ | 1 | $E_0$ | 1 |
| $E_1$ | 1 | $E_0$ | 0 | $E_0$ | 1 |
| $E_1$ | 1 | $E_1$ | 1 | $E_1$ | 1 |

The above Table II indicates that the circuit of FIG. 3 is capable of performing the algebraic operation of $A+B=C$. By varying the circuit parameters (in a manner to be explained in connection with FIG. 4), the circuit may be adapted to perform the algebraic operation $A\times B=C$. Further consideration of such a multiplication operation is given below.

Figure 4:
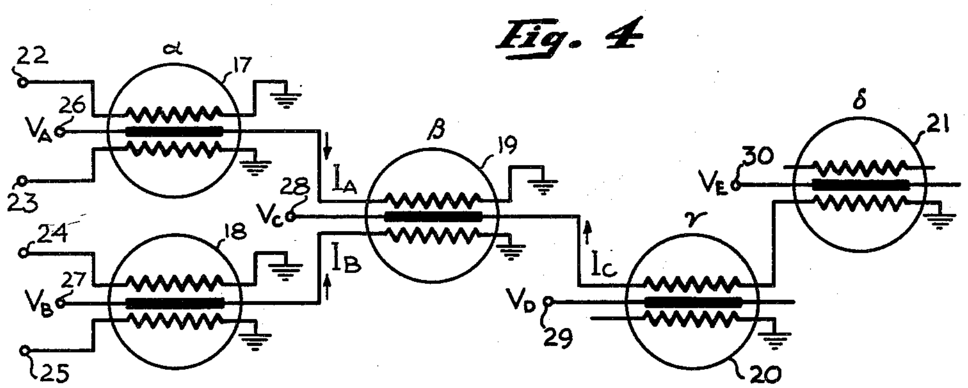
FIG. 4 is a schematic circuit diagram of another logical circuit in accordance with the invention.

FIG. 4 is a schematic circuit diagram of a logical circuit including a plurality of superconductive devices connected in cascade. The circuit of FIG. 4 includes an α gate section comprising the superconductive devices 17 and 18, a β gate section comprising a superconductive device 19, a γ gate section comprising a superconductive device 20 and a δ gate section comprising a superconductive device 21. Each of the superconductive devices 17 to 21 is represented diagrammatically by a circle which encloses a superconductor in the form of a thin film of a material capable of being switched from a superconductive state to an electrically resistive state, along with a pair of control elements adapted to perform a switching operation in response to current flow therethrough.

It will be noted that the representation of the control elements of FIG. 4 differs from the control elements 7 and 8 of FIG. 3 in that the adjacent conductors of FIG. 4 are each represented by a conventional symbol for a resistance. By constructing the adjacent conductors of material possessing electrical resistance at the temperature of operation of the device, the external series connected resistors between the source of input signals and the superconductive devices may be omitted, and the devices may be arranged to switch the superconductors to an electrically resistive state in response to heat generated in the control elements.

In FIG. 4 input signals may be applied to the control elements of the upper superconductive control device 17 of the α gate section by means of a pair of input terminals 22 and 23. In a similar fashion, input signals may be applied to the control elements of the lower superconductive control device 18 of the α gate section by means of a pair of input terminals 24 and 25. Through an occurrence or concurrence of input signals applied to the input terminals 22 to 25, the superconductors of the devices 17 and 18 may be individually switched to an electrically resistive state so that a portion of the voltage $V_A$ and $V_B$ applied to the terminals 26 and 27 appears as a voltage drop across the superconductors in their electrically resistive state. Similar voltages $V_C$, $V_D$ and $V_E$ may be applied to the terminals 28, 29 and 30 connected to the superconductors of, respectively, the devices 19 to 21 of the β, γ and δ gate sections.

A particular advantage of the arrangement illustrated in FIG. 4 is that it is possible to change from one logical operation to another logical operation (for example, from an $A+B$ operation to an $A\times B$ operation by changing only an externally applied voltage. For example, by varying the potentials $V_A$ and $V_B$ applied to the superconductor input terminals 26 and 27, the operation of the device 19 can be changed to modify the logical operation performed. That is, if the superconductors in the devices 17 and 18 of the α gate section are in an electrically resistive state, $V_A$ and $V_B$ may be adjusted so that the total current through the gate section is insufficient to switch the superconductor of the device 19 to an electrically resistive state. Then, when neither the device 17 nor the device 18 is in a superconductive state, i.e., when $A=0$ and $B=0$, the output signal from the β gate section has a value corresponding to $C=1$. On the other hand, when the superconductor of either of the devices 17 and 18 is in a superconductive state, the superconductor of the device 19 is switched to an electrically resistive state under the influence of the increased currents flowing in the control elements of the device 19. Hence, α and β gate sections of FIG. 4 are capable of performing the operations set forth below:

*Table III* ($C=\overline{A+B}$)

| A | B | C |
|---|---|---|
| 0 | 0 | 1 |
| 0 | 1 | 0 |
| 1 | 0 | 0 |
| 1 | 1 | 0 |

which corresponds to the logical equation $C=\overline{A+B}$.

To modify the logical operation of the circuit, the voltages $V_A$ and $V_B$ may be reduced to the point where both of the superconductors of the devices 17 and 18 in the $\alpha$ gate section must be superconducting to cause the superconductor of the device 19 in the $\beta$ gate section to become normally resistive so that the circuit performs the following operations:

*Table IV* ($C=\overline{A\times B}$)

| A | B | C |
|---|---|---|
| 0 | 0 | 1 |
| 0 | 1 | 1 |
| 1 | 0 | 1 |
| 1 | 1 | 0 |

which corresponds to the logical equation $C=\overline{A\times B}$.

In FIG. 4, the superconductor of the device 19 is connected serially with a control element of each of the devices 20 and 21, so that current flow through the $\beta$ gate section may control both the $\gamma$ and $\delta$ gate sections. Where the apparatus is adapted to operate in a mode of operation in which the control elements apply magnetic fields to a superconductor, a bucking current may be applied to a control element to influence the operation of the device. For example, in FIG. 4, the currents $I_A$ and $I_B$ are in one direction, while $I_c$ is in the opposite direction. Where the superconductors of the devices 17 and 18 are electrically resistive and $I_A$ and $I_B$ are at a corresponding low value, $V_c$ applied to the terminal 28 may be chosen so that the current flow $I_c$ through the superconductor of the device 19 is sufficiently high to render the device 19 also electrically resistive. Then, when the currents $I_A$ or $I_B$ increase, the effect is subtractive with respect to current produced by the current $I_c$ which reduces the magnetic field within the superconductive device 19 so that the superconductor returns to a state of superconductivity. By a proper selection of the voltages $V_A$, $V_B$ and $V_c$ the logical operations $C=A+B$ or $C=A\times B$ can be performed.

Figure 5:
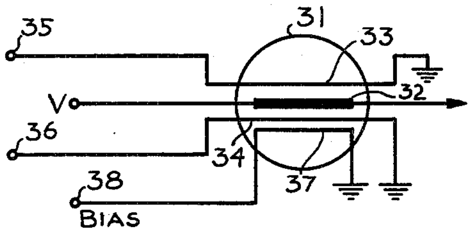
FIG. 5 is a diagrammatic illustration of a superconductive device adapted to receive a biasing current.

An alternative arrangement of a superconductive device adapted to operate under the influence of a biasing voltage is illustrated in FIG. 5 in which a device 31 represented diagrammatically by a circle encloses a superconductor 32 connected to receive a voltage and which is capable of being switched to an electrically resistive state, a pair of control elements 33 and 34 for receiving input signals from the terminals 35 and 36, and an auxiliary conductor 37 which is adapted to receive a biasing voltage from a terminal 38 to generate a magnetic field which may be either additive or subtractive with respect to the magnetic fields generated by current flow through each of the control elements 33 and 34 and the superconductor 32.

In the above discussion of the operation of the circuits of FIGS. 3–5, the feedback effect of the output signal flowing in the superconductor has been ignored. For example, in FIG. 4 the effect of changes in $I_A$ and $I_B$ have been considered but not the effect of changes in $I_c$ upon the control of the $\beta$ gate section device 19. Changes in $I_c$ serve to control the $\gamma$ gate section device 20. Since $I_c$ flows through the superconductor of the device 19, a magnetic field may be generated by the current flow which in itself may exert a control over the state of the superconductor of the device 19. Thus, there may be an interaction between the various currents flowing through the superconductor and control elements of a given superconductive device which cumulatively may be used to control the state of a superconductor.

Figure 6:
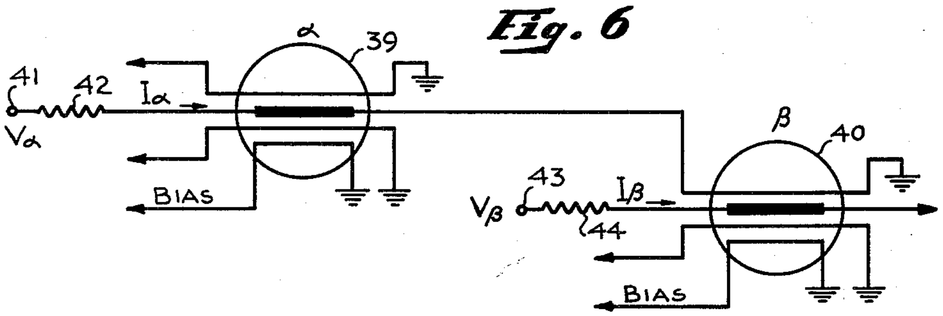
FIG. 6 is a schematic circuit diagram of a logical circuit including the device of FIG. 5.

In order to analyze the interaction between the various currents flowing in a superconductive circuit in accordance with the invention, reference is made to FIG. 6 which illustrates a pair of superconductive devices 39 and 40 in which the current flow through the superconductor of one device 39 comprising an $\alpha$ gate section is applied to a control element of a successive device 40 comprising a $\beta$ gate section. The superconductor of the $\alpha$ gate section may receive a voltage from a terminal 41 via a resistor 42 and in similar fashion the $\beta$ gate superconductor may receive a voltage from a terminal 43 via a resistor 44.

The current flow, I, through a superconductor in the resistive state is given by the following equation:

$$I=\frac{V}{R+R_s}$$

where R is the resistance of a resistor, such as the resistor 42 or the resistor 44, connected serially with the superconductor and $R_s$ is the resistance of the superconductor when it is in the resistive state. Also, $$I+\Delta I=\frac{V}{R}$$

where $\Delta I$ equals a change in current produced when the superconductor switches from a resistive to a superconductive state and V equals a voltage applied to the terminal 41 or the terminal 43. Therefore, $$\Delta I=\frac{V}{R}-\frac{V}{R+R_s}=\frac{VR_s}{R(R+R_s)}=I\frac{R_s}{R}$$

If we assume that both of the superconductive devices of FIG. 6 are of identical construction and that only the applied voltages may be varied, the magnetic fields at a superconductor produced by the currents flowing through the control elements of a given value are dependent only upon the physical relationship between the control elements and the superconductor.

Referring to the $\beta$ gate superconductive device 40 of FIG. 6, the field at the superconductor produced by current flowing through the control element is given by $$H_1=kI\alpha$$

where $k$ is a constant corresponding to the field at the $\beta$ gate superconductor produced by currents in either of the control elements. In addition, the self field produced by current flow through the $\beta$ superconductor itself is given by $$H_2=k_sI_\beta$$

where $k_s$ corresponds to the field produced at the superconductor by current through itself.

The critical condition of interaction between the currents occurs when a current change in one of the inputs causes a change in the output current. If a first change, $k\Delta I\alpha$, is less than the resulting change, $k_s\Delta I_\beta$, then either the gate will fail to stay switched or it will not be possible to switch it back on the reverse cycle. Thus, for satisfactory operation $$k\Delta I\alpha>k_s\Delta I_\beta$$

Where a current is applied to a biasing element in a device of the circuit of FIG. 6, $\Delta I\alpha=\Delta I_\beta$ so $k>k_s$. If no bias current is used and operation is changed by varying the primary voltage, the $\Delta I_A$ no longer equals $\Delta I_B$ but $$k\frac{V_\alpha R_s}{R(R+R_s)}>k_s\frac{V_\beta R_s}{R(R+R_s)}$$

or $$kV\alpha>k_sV_\beta$$

In some cases the value of the voltage applied to the terminal 41 connected to the first superconductive device will be larger than the value of the voltage applied to the terminal 43 connected to the second device, that is, $V\alpha>V_\beta$, but in some instances it is likely that the reverse will be true. Hence, the use of a bias circuit is advantageous since it imposes a uniform condition on all the superconductive devices rather than less on some and greater on others.

One way in which the aforementioned difficulty arising from the interaction of current flow through the superconductive devices may be overcome is by using the devices in a computer or data processing system in which the input signals are in the form of periodically recurrent pulses. For example, each cycle may start with no current flow in any of the control elements or superconductors so that all of the superconductors are in a superconductive state. By applying pulses to the control elements and the superconductors, the superconductors may be switched to a resistive state in which the magnetic field increases in part due to the current flow through the superconductor which helps to maintain the superconductor in a resistive state for the duration of the pulse. At the end of the pulse the currents fall to zero and the superconductors are returned to a superconductive state ready to receive subsequent pulses. By applying pulses to selected ones of the control elements and to the superconductors, the logical operations described above may be be readily performed. In addition, the operation of the devices may be enhanced by applying steady state bias currents which are insufficient alone to render the superconductors electrically resistive.

Another way in which the interaction between the current flow may be overcome is through a modification of the construction of the superconductive device so that the current in a control element is arranged to make multiple passes near the superconductor. A diagrammatic illustration of one such arrangement is given in FIG. 7 in which a superconductive device 15 includes a superconductor 46 and at least one control element 47 which is arranged to pass adjacent tot he superconductor 46 several times, thereby increasing the flux linkage between the superconductor and the control element 47.

The problem of interaction between the currents flowing in the control elements and the superconductors arises as well in superconductive devices adapted to operate by applying heat to the superconductor. That is, the effective temperature change of the superconductor is proportional to the change in heat input $\Delta Q=C\Delta T$ where $\Delta Q$ represents the rise in temperature of the superconductor, $\Delta T$ represents the rise in temperature of the control element, and C represents the effective heat transfer coefficient. Temperature rise at the $\beta$ superconductor when an $\alpha$ superconductor switches is $$\Delta T_1=\frac{\Delta Q}{C}=\frac{(I+\Delta I)^2R-I^2R}{C}=\frac{I^2R}{C}\left(\frac{2R_s}{R}+\frac{R_s^2}{R^2}\right)$$
$$=\frac{I^2R_s}{C}\left(2+\frac{R_s}{R}\right)$$

An additional temperature rise which occurs when the $\beta$ superconductor becomes resistive due to its own heating is given by $$\Delta T_2=\frac{I^2R_s}{C_s}$$

In order to keep the heat being generated within the superconductor from overcontrolling the superconductive device, $$\Delta T_1>T_2$$

or $$\frac{2+\frac{R_s}{R}}{C}>\frac{1}{C_s}$$

$$\frac{C}{C_s}<2+\frac{R_s}{R}$$

The problem of interaction in superconductive devices which function to switch a superconductor by the application of heat is much less severe than where a superconductor is switched by the application of a magnetic field since the difficulty can be partly compensated by making the resistance of the superconductor in an electrically resistive state, $R_s$, larger than an external resistance R to which the superconductor is connected serially. In addition, interaction can be minimized through the use of the circuits in a recurrent pulse system in which information is represented by recurrent electrical pulses, so long as the circuits return to thermal equilibrium between pulses.

The thermal time delays inherent in a superconductive device adapted to operate by switching the superconductor to an electrically resistive state in response to applied heat may be used to advantage in constructing an information storage device. For example, assume that a superconductor and control element are arranged as illustrated diagrammatically in FIG. 8. Where $T_c$ is the effective temperature of the input or control element 48 of a superconductive device 49, and $T_s$ is the effective temperature of a superconductor 50, the heat conduction equations for $T_c$ and $T_s$ are $$\frac{dT_c}{dt}+a_cT_c=b_sT_s$$

$$\frac{dT_s}{dt}+a_sT_s=b_cT_c$$

where $a_c$, $a_s$, $b_c$ and $b_s$ are reciprocal time constants which embody the heat capacities and heat transfer characteristics between the elements and between each element and its surroundings. An initial condition of interest is when $T_c$ has been raised by a pulse to $T_0$. Then $T_c=T_0$ and $T_s=0$.

Solutions of the differential equations given above for the heat conduction of $T_c$ and $T_s$ would then be $$T_c=T_0e^{-f_1t}\cosh f_2t+\frac{T_0}{2f_2}(a_s-a_c)e^{-f_1t}\sinh f_2t$$

$$T_s=\frac{b_c}{f_2}T_0e^{-f_1t}\sinh f_2t$$

where $$f_1=\frac{a_s+a_c}{2}$$

$$f_2=\sqrt{\frac{(a_s-a_c)^2+4b_sb_c}{2}}$$

The behavior of the superconductor temperature $T_s$ is of particular interest. It will rise from zero to a maximum and then will rapidly decay. The maximum is given by $$\frac{dT_s}{dt}=0$$

for which $-f_1\sinh f_2t+f_2\cosh f_2t=0$ or $$\tanh f_2t_m=\frac{f_2}{f_1}$$

This suggests the following normalized form for $T_s$ $$\frac{T_s}{T_0}\frac{f_2}{b_c}=e^{-f_1\tau/f_2}\sinh\tau$$

where $$\tau=f_2t$$

The two heat transfer parameters are $$\frac{b_c}{f_2}\text{ and }\frac{f_2}{f_1}.$$

To see what is a reasonable range of magnitude for these, let us assume that the heat transfer characteristics between the two elements and between each element and its surroundings are about the same. Then $$a_c \doteq a_s,\ b_c \doteq b_s \text{ and } b_o \doteq \frac{a_o}{2}$$

Hence $$\frac{f_2}{f_1} \doteq \frac{2b_c}{2a_o} \doteq 1/2\frac{b_c}{f_2} \doteq \frac{b_o}{b_o} \doteq 1$$

Figure 9:
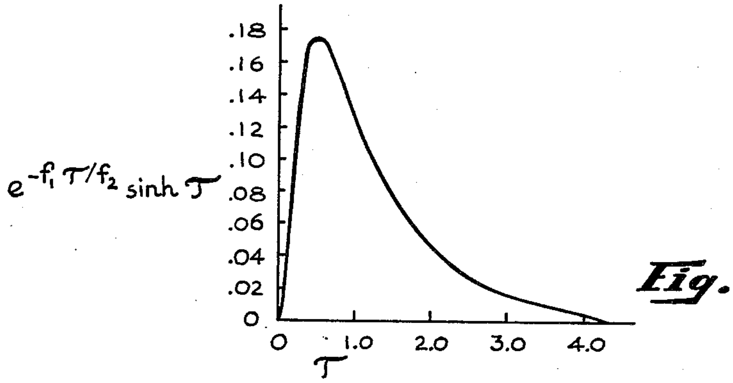
FIG. 9 is a graphical illustration of the heat transfer between adjacent superconductors as a function of time.

Using the above values, the function $e^{-f\tau/f_2}$ sinh $\tau$ is plotted in FIG. 9 to show its behavior.

In the curve of FIG. 9 it can be seen that a heat pulse applied to a control element will arrive at a superconductor after a delay and will then decay. Assuming that the device is to be used in a clock pulse system, in which the interval between recurrent clock pulses is chosen to correspond to an interval of $\tau \doteq 1$, then the temperature of the superconductor will be approximately ⅛ $T_o$. At the time the succeeding clock pulse arrives, the superconductor has fallen to about ¼ of this value which means that it rapidly loses its memory of any but the preceding event in the input element. Thus, the superconductive device is capable of storing information in the form of the resistive condition of the superconductor for a short interval of time.

Figure 8:
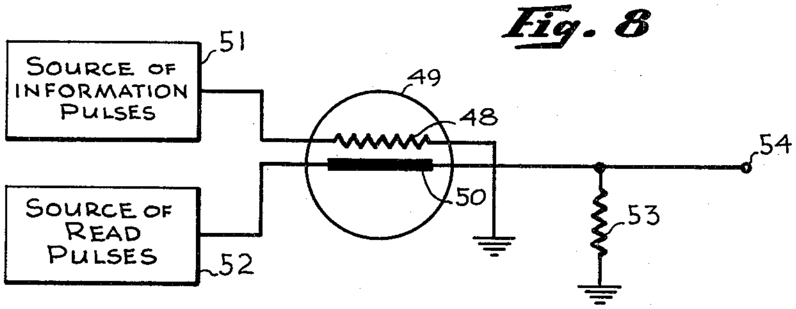
FIG. 8 is a combined block and schematic circuit diagram of an information storage circuit in accordance with the invention.

Accordingly, in the information storage circuit of FIG. 8, information in the form of pulses from a source 51 may be applied to a control element 48 in the device 49 to switch the superconductor to an electrically resistive state due to the rise in temperature produced by heat generated within the control element 48. A subsequent pulse from a source of read pulses 52 encounters an electrically resistive superconductor 50 so that the pulse divides between the resistance of the superconductor 50 and an external resistor 53. By making the resistance value of the resistor 53 lower than the internal resistance of the superconductor 50, a voltage pulse appearing at an output terminal 54 may have an amplitude representing the resistive state of the superconductor 50 and, hence, the stored information. In the absence of a preceding information pulse applied to the control element 48, the superconductor 50 remains superconductive with the entire read pulse appearing across the resistor 53 and at the terminal 54.

The superconductive devices of FIGS. 3–8 may be constructed by vacuum deposition techniques in which suitable materials are deposited in thin layers in an area defined by a mask. Between the conducting layers, insulating layers may be applied so that a sandwich is formed.

Figure 10:
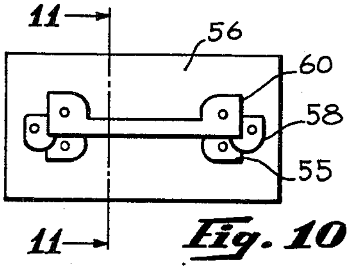
FIG. 10 is a plan view of a superconductive device in accordance with the invention.
Figure 11:
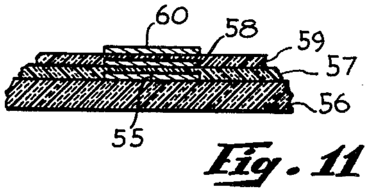
FIG. 11 is an enlarged sectional view taken along line 11—11 of FIG. 10.

In FIGS. 10 and 11 there is illustrated a superconductive device in which a first control element 55 is deposited on a base 56. An insulating layer 57 is deposited on the first control element 55 and a sueprconductor 58 is deposited on top of the insulating layer 57. Another insulating layer 59 is deposited on top of the superconductor 58 and a second control element 60 is deposited on top of the second insulating layer 59 so that a sandwich-like construction is formed in which the thin films of the control elements 55 and 60 are in intimate relationship with the thin film of the superconductor 58 so as to produce an interaction through which currents flowing in the control elements 55 and 60 may effectively switch the superconductor 58 to an electrically resistive state through the application of magnetic fields or heat to the superconductor 58. As illustrated in FIG. 10, the end portions of each of the elements may be enlarged and offset from the others to facilitate an electrical connection.

Figure 7:
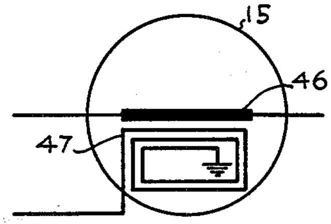
FIG. 7 is a diagrammatic illustration of a superconductive device which enhances the effect of an input current.

Through suitable masking of each of the thin films being deposited, the superconductor and the control elements may be confined to any desired configuration such as the configuration in FIG. 7 in which the control element passes adjacent the superconductor a number of times to enhance the effect of an input current applied to the control element.

In a particular embodiment of a superconductive device in accordance with the invention, each of the control elements and the superconductor in an arrangement similar to FIGS. 10 and 11 may comprise thin films each having a thickness of the order of $10^{-5}$ cm. separated by insulating layers each having a thickness of the order of $10^{-4}$ cm. The thin films of the superconductor and control elements in the arrangement of FIGS. 10 and 11 may have a width of approximately $2\times10^{-3}$ cm., and a length of the order of 1 cm. Other dimensions may be used, the only requirement being that an intimate relationship be established between the thin films of the superconductor and the control elements.

Examples of materials which may be used for the superconductor are tin, lead, indium and tantalum. The same material or a material having a higher transition temperature than that of the superconductor may be used for the control elements where the device is adapted to operate in the mode of operation in which the superconductor is switched by magnetic fields generated by currents through the control elements. Where the superconductor is to be switched by the application of heat generated by current flow in the control elements, the control elements should preferably be made of non-superconductive materials, such as, for example, chromium, nickel or iron.

Figure 12:
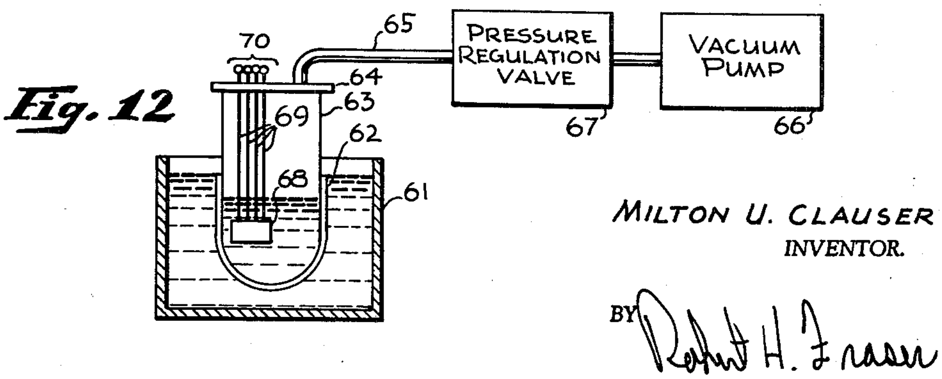
FIG. 12 is a diagrammatic illustration of apparatus for maintaining the electrical circuits of the present invention at a selected temperature at which the electrical circuits are superconductive.

FIG. 12 is a diagrammatic illustration of an arrangement for maintaining the circuits of the present invention at a suitable low temperature near absolute zero. In FIG. 12 there is shown an exterior insulated container 61 which is adapted to hold a coolant such as liquid nitrogen. Within the container 61 an inner insulated container 62 is suspended for holding a coolant, such as liquid helium, which maintains the circuits of the invention at the proper operating temperature. The top of the container 62 may be sealed by a sleeve 63 and lid 64 through which a conduit 65 connects the inner chamber with a vacuum pump 66 and a pressure regulation valve 67. The pump 66 functions to lower the atmospheric pressure within the chamber so as to control the temperature of the helium. The pressure regulation valve 67 functions to regulate the pressure within the chamber so that the temperature is held constant.

A data processing system or a computer comprising circuits 68 including superconductive components in accordance with the invention may be suspended in the liquid helium at the proper operating temperature at which the circuit components are superconducting. Connection to the circuit 68 is made by the lead-in wires 69 which also may be constructed of a superconducting material within the cooled region to minimize resistance. The lead-in wires 69 extend through the lid 64 to the terminals 70. One or more of the lead-in wires may be employed to apply input signals to the circuits while others of the lead-in wires may be used to derive output signals from the circuits.

By means of the superconductive circuits of the invention, a complete computing or data processing system may be assembled including superconductive information storage devices as well as logical circuits so that the entire system may be operated as a unit at one operating temperature with the advantages of small size, efficiency, and high speed of operation. It should be understood that the illustrative arrangements of the circuits and devices of FIGS. 1–8 and 10–11 are given as examples only of a few ways in which the invention may be used to advantage. Accordingly, the invention should not be limited to the particular structure set forth herein, but should be given the full benefit of any and all equivalent arrangements falling within the scope of the annexed claims.

What is claimed is:

1. An electrical circuit including the combination of an output circuit including a superconductor in the form of a film constructed of a material which is capable of being switched from a superconductive condition to an electrically resistive condition, a control element in the form of a pair of films positioned on opposite sides of the superconductor film for switching the superconductor film between a superconductive condition to introduce an impedance in said output circuit and an electrically resistive condition, and means coupled to the control element for applying currents to the control element for effecting a transition between a superconductive condition and an electrically resistive condition in the superconductor film.

2. An electrical circuit element in accordance with claim 1 in which said control element films are constructed of a material which is capable of remaining in a superconductive condition while effecting a transition between a superconductive condition and an electrically resistive condition in the superconductor film.

3. An electrical circuit element in accordance with claim 1 in which the control element films are constructed of a material which is electrically resistive to provide heat energy in response to the applied currents for effecting the transition between a superconductive condition and an electrically resistive condition in the superconductor film by varying the temperature of the superconductor film.

4. An electrical circuit element including the combination of a base constructed of an insulating material, a first film deposited on the base, a layer of insulating material deposited on the first film, an output circuit including a second film deposited on the insulation layer constructed of a superconductive material which is capable of being switched from a superconductive condition to an electrically resistive condition to introduce electrical resistance into said output circuit, a second insulating layer deposited on the second film, a third film deposited on the second insulating layer, and means applying currents to the first and third films for selectively effecting a transition in the second film between a superconductive condition and an electrically resistive condition.

5. An electrical circuit element in accordance with claim 4 in which the first and third films are constructed of superconductive materials which are capable of remaining in a superconductive condition while the second film is in an electrically resistive condition.

6. An electrical circuit element in accordance with claim 4 in which the first and third films are constructed of electrically resistive materials for generating heat in response to applied currents which elevate the temperature of the second film to render the second film electrically resistive.

7. An electrical circuit element including the combination of a plurality of electrically conductive films arrayed alongside each other, a plurality of insulation layers interleaved with the electrically conductive films, an output circuit including at least one of the films constructed of a material which is normally in a superconductive condition, and means applying currents to others of the films to switch the superconductive film to an electrically resistive condition whereby electrical resistance is selectively introduced into said output circuit.

8. A logical circuit including the combination of an output circuit including a superconductor in the form of a film which is capable of being switched from a superconductive condition to an electrically resistive condition to introduce electrical resistance into said output circuit, a first electrically conductive control element disposed adjacent the superconductive film, a second electrically conductive control element disposed adjacent the superconductive film, a first source of input signals connected to the first control element, a second source of input signals connected to the second control element, said control elements being adapted to render the superconductor film electrically resistive in response to the appearance of signals from said sources, and means connected to the output circuit for deriving an output voltage having one distinct value when the superconductor film is in a superconductive condition and another distinct value when the superconductor film is in an electrically resistive condition.

9. A logical circuit in accordance with claim 8 in which the control elements are constructed of materials which remain in a superconductive condition when the superconductor film is rendered electrically resistive.

10. A logical circuit in accordance with claim 8 in which the control elements are constructed of materials which are electrically resistive at the operating temperature of the device whereby heat is generated in response to the currents from the sources to elevate the temperature of the superconductor film for effecting a transition from a superconductive condition to an electrically resistive condition.

11. An electrical circuit including a superconductive element which is capable of being switched from a superconductive condition to an electrically resistive condition in response to a change in temperature, a control element positioned beside the superconductive element for applying heat to the superconductive element, means applying an information pulse to the control element to render the superconductive element electrically resistive, and means applying a subsequent read pulse to the superconductive element to determine the presence of an electrically resistive condition.

12. An electrical circuit comprising a first superconductive element including a first film of a material normally superconductive at an established ambient temperature, means for switching the first superconductive element to a resistive condition comprising a second film of material disposed beside and along a longitudinal section of the first element but electrically insulated therefrom, and means for ascertaining the condition of the first superconductive element.

13. An electrical circuit in accordance with claim 12 wherein the switching means comprises a third film of material disposed as the second film but on the side of the superconductive element remote from the second film.

14. An electrical circuit in accordance with claim 12 wherein the switching means further includes an auxiliary conductor adjacent the first superconducting element and means for maintaniing a bias current therein predisposing the first superconductive element to be switched to a resistive condition for current in one direction in the second film.

15. An electrical circuit in accordance with claim 12 wherein the switching means includes a current source connected to the second film for producing a selected value of current in the second film in excess of the value needed to switch the first superconductive element at the established ambient temperature.

16. An electrical circuit in accordance with claim 15 wherein the disposition of the second film and the first superconductive element is such that the first superconductive element is switched by a magnetic field established by the current in the second film.

17. An electrical circuit in accordance with claim 16 wherein the second film is a superconductive material having a transition temperature above that of the material of the first superconductive element.

18. An electrical circuit in accordance with claim 15, wherein the second film is a material which is resistive at the selected value of current therethrough in order to generate sufficient heat to raise the temperature of the first superconductive element above its transition temperature.

19. An electrical circuit in accordance with claim 12 wherein the switching means further comprises a second superconductive element having a film of superconductive material connected to the second film of the first superconductive element and control means connected to the second superconductive element.

20. An electrical circuit in accordance with claim 12 wherein the means for ascertaining the condition of the first superconductive element comprises a third superconductive element having a first film of superconductive material and a second film of material disposed adjacent to and along the longitudinal section thereof but electrically insulated therefrom, the second film of the third superconductive element being connected in circuit with the first film of the first superconductive element.

21. An electrical circuit in accordance with claim 12 wherein the second film comprises a multiloop winding adjacent to but not encircling the first film.

22. An electrical circuit in accordance with claim 13 wherein each of the films has a thickness of approximately $10^{-5}$ cm., a width of approximately $2\times10^{-3}$ cm. and a length of approximately 1 cm. with non-overlapping end portions to which electrical connections may be made, and the adjacent films are separated by insulation approximately $10^{-4}$ cm. thick.

References Cited in the file of this patent

UNITED STATES PATENTS

| | | |
|---|---|---|
| 2,189,122 | Andrews | Feb. 6, 1940 |
| 2,522,153 | Andrews | Sept. 12, 1950 |
| 2,832,897 | Buck | Apr. 29, 1958 |
| 2,913,881 | Garvin | Nov. 24, 1959 |
| 2,930,908 | McKeon et al. | Mar. 29, 1960 |
| 2,981,933 | Crowe et al. | Apr. 25, 1961 |
| 3,021,434 | Blumberg et al. | Feb. 13, 1962 |

OTHER REFERENCES

"A Magnetically Controlled Gating Element," by D. A. Buck, Proceedings of the Eastern Joint Computer Conference, Dec. 10–12, 1956, published by A.I.E.E., June 1957.

"Trapped-Flux Superconducting Memory," (Crowe) I.B.M. Journal, October 1957, pp. 295–303.

"An Analysis of the Operation of a Persistent-Supercurrent Memory Cell" (Garwin) I.B.M. Journal October 1957, pp. 304–308.

"Some Experiments at Radio Frequencies on Superconductors" (Silsbee et al.), Journal of Research of the National Bureau of Standards, vol. 20, February 1938—Research Paper RP1070, pages 109–119.

"A Review of Superconductive Switching Circuits" (Slade et al.), National Electronics Conference, vol. XIII, October 7–9, 1957, pages 574–581.

"A Computer Memory Element Employing Superconducting Persistent Currents," Aeronautical Research Lab. of Ramo-Wooldridge Corp., ARL–7–57, copy 293, Oct. 28, 1957, pages 1–4.